United States Patent [19]

Berkes et al.

[11] Patent Number: 5,012,290
[45] Date of Patent: Apr. 30, 1991

[54] INCREASED TRANSFERENCE OF A TONER IMAGE ON TO A COPY SHEET BY USING A ZERO TENSION LOOP APPLIED AFTER COROTRON TRANSFER

[75] Inventors: John S. Berkes, Webster; Frank J. Bonsignore, Rochester, both of N.Y.

[73] Assignee: Xerox Corporation, Stamford, Conn.

[21] Appl. No.: 561,395

[22] Filed: Aug. 1, 1990

[51] Int. Cl.$^5$ ............................................. G03G 15/14
[52] U.S. Cl. .................................... 355/271; 355/275; 355/277; 355/309
[58] Field of Search ............... 355/309, 317, 321, 277, 355/316, 28, 275, 315, 271, 273, 308, 212; 271/273

[56] References Cited

U.S. PATENT DOCUMENTS

| | | |
|---|---|---|
| 3,601,392 | 8/1971 | Spear, Jr. ............................... 271/53 |
| 3,957,367 | 5/1976 | Goel ....................................... 355/281 |
| 4,013,041 | 3/1977 | Armstrong et al. ................. 118/656 |
| 4,017,065 | 4/1977 | Poehlein ................................ 271/80 |
| 4,062,631 | 12/1977 | Ichikawa et al. .................... 355/315 |
| 4,236,809 | 12/1980 | Kermisch ............................. 355/326 |
| 4,508,334 | 4/1985 | Iwanaga ........................... 355/315 X |
| 4,914,482 | 4/1980 | Ammenheuser et al. .......... 355/271 |
| 4,928,141 | 5/1990 | Poehlein et al. ..................... 355/208 |
| 4,945,387 | 7/1990 | Landa et al. ......................... 355/271 |
| 4,951,095 | 8/1990 | Warden ................................ 355/273 |

Primary Examiner—A. T. Grimley
Assistant Examiner—Thu A. Dang
Attorney, Agent, or Firm—Michael W. Starkweather

[57] ABSTRACT

The present invention comprises a printing machine of the type having a toner image interposed between a flexible member and a sheet. Specifically, the printer has a device for transferring the toner image from the flexible member to the sheet, an apparatus separating the sheet from the flexible member, and a device, located intermediate the transferring means and the separating means, for providing a relative motion between the sheet and flexible member so as to reduce electrostatic forces between the toner and flexible member for improving transfer efficiency. Specifically, the device for providing relative motion incorporates a device for creating a substantially non-tensioned condition in the flexible member and sheet. More particularly, the invention has apparatus for forming a non-tensioned buckle in the portion of the flexible member located intermediate the transferring means and the separating means so as to form the non-tensioned condition in the buckle portion of the flexible member and a tensioned condition in the remainder of the flexible member. More specifically, the non-tensioned buckle comprises a gripping device to hold the flexible member on the outside edges so as to maintain the non-tensioned buckle thus improving transfer efficiency.

27 Claims, 2 Drawing Sheets

INCREASED TRANSFERENCE OF A TONER IMAGE ON TO A COPY SHEET BY USING A ZERO TENSION LOOP APPLIED AFTER COROTRON TRANSFER

BACKGROUND OF THE INVENTION

1. Field of the Invention

The present invention relates generally to an electrographic apparatus and more specifically to an improved structural arrangement in electrograhpic apparatus of the type having a flexible electrostatic image-bearing web or an intermediate flexible web, which arrangement achieves improved image transfer to paper by providing a zero tension loop in the web located after a transfer station and before detacking of the paper from the web.

2. Description of the Prior Art

It is known in the copying art to form buckles in a flexible electrostatic image-bearing web in its movement through the copier at various locations and for various functions. For example, U.S. Pat. No. 3,601,392, discloses the idea of interrupting the forward movement of a copy sheet with registration fingers and to form a buckle in the copy sheet by its continued feeding by upstream feed rollers to provide registration of the lead edge of the copy sheet before the copy sheet is fed into the image transfer station. U.S. Pat. No. 4,017,065, discloses a speed mismatch compensation system which allows the fusing roll nip to be closely spaced from the transfer station of an electrostatographic copier by a distance less than the movement dimension of an individual copy sheet. The intermediate portion of the copy sheet is selectively supported and guided in a manner so as to form a buckle which accommodates a speed differential between the fuser roll nip velocity and the velocity of the photoreceptor. Another example is U.S. Pat. No. 4,928,141, which discloses a copier wherein a copy sheet is longer than the distance between the transfer station and the fusing station. Thus the copy sheet forms a buckle therebetween. A sensor detects when the buckle reaches predetermined configurations and sends a signal to a stepping motor to increase or decrease the speed of the fuser to maintain the buckle configuration within the preassigned parameters. U.S. Pat. No. 4,013,041 discloses an electrographic apparatus employing a brush-type developer applicator which contacts one side of a flexible electrostatic image-bearing web, where the web is free to buckle in response to the varying contours of the applicator.

The ideal goal in xerography is to have high transference efficiency when the toner image is transferred to a sheet; machines that can achieve this for less cost will have a tremendous competitive edge. Thus far, the use of an electrically biased transfer roller, BTR for short, is a leader in achieving higher transfer efficiency. However, the BTR is relatively more expensive. The less expensive system, with better wearing longevity characteristics is the corona generating device. However, there is relatively less transfer efficiency with the corona than the BTR. Herein lies the problem, more expense for better efficiency or less expense for less efficiency.

Therefore, in response to this tradeoff of expense for quality, a need exists for a way to increase transfer efficiency while maintaining reduced costs.

As a result, the present invention provides a solution to the described problems and other problems, and also offers other advantages over the prior art.

SUMMARY OF THE INVENTION

The present invention comprises three main ideas. First, a printing machine of the type having a toner image interposed between a flexible member and a copy sheet (paper or otherwise). Specifically, the printer has a device for transferring the toner image from the flexible member to the sheet, an apparatus separating the sheet from the flexible member, and a device, located intermediate the transferring means and the separating means, for providing relative motion between the sheet and the flexible member so as to reduce electrostatic forces between the toner and flexible member for improving transfer efficiency.

Second, a method of transferring a toner image from a flexible member to a sheet, comprising the following steps. First, placing a toner image onto the flexible member. Second, bringing the sheet into contact with the flexible member. Third, transferring the toner image from the flexible member to the sheet in contact therewith. Fourth, providing relative motion between the sheet and the flexible member for improving transfer efficiency by reducing electrostatic forces between the toner and flexible member.

The third main idea covered in the present invention describes a color printing machine of the type having a plurality of different color toner images on a flexible member. The color printer having a device for transferring the color toner images from the flexible member to a sheet in contact therewith. Moreover, the printing machine has an apparatus for separating the sheet from the flexible member. Finally, the printer has a device, located intermediate the transferring device and separating apparatus, for providing relative motion between the sheet and the flexible member so as to reduce electrostatic forces between the toner and flexible member for improving transfer efficiency.

BRIEF DESCRIPTION OF THE DRAWINGS

In the drawings, like reference numerals indicate corresponding parts of preferred embodiments of the present invention throughout the several views, in which.

DETAILED DESCRIPTION OF THE PREFERRED EMBODIMENTS

Figure 1:
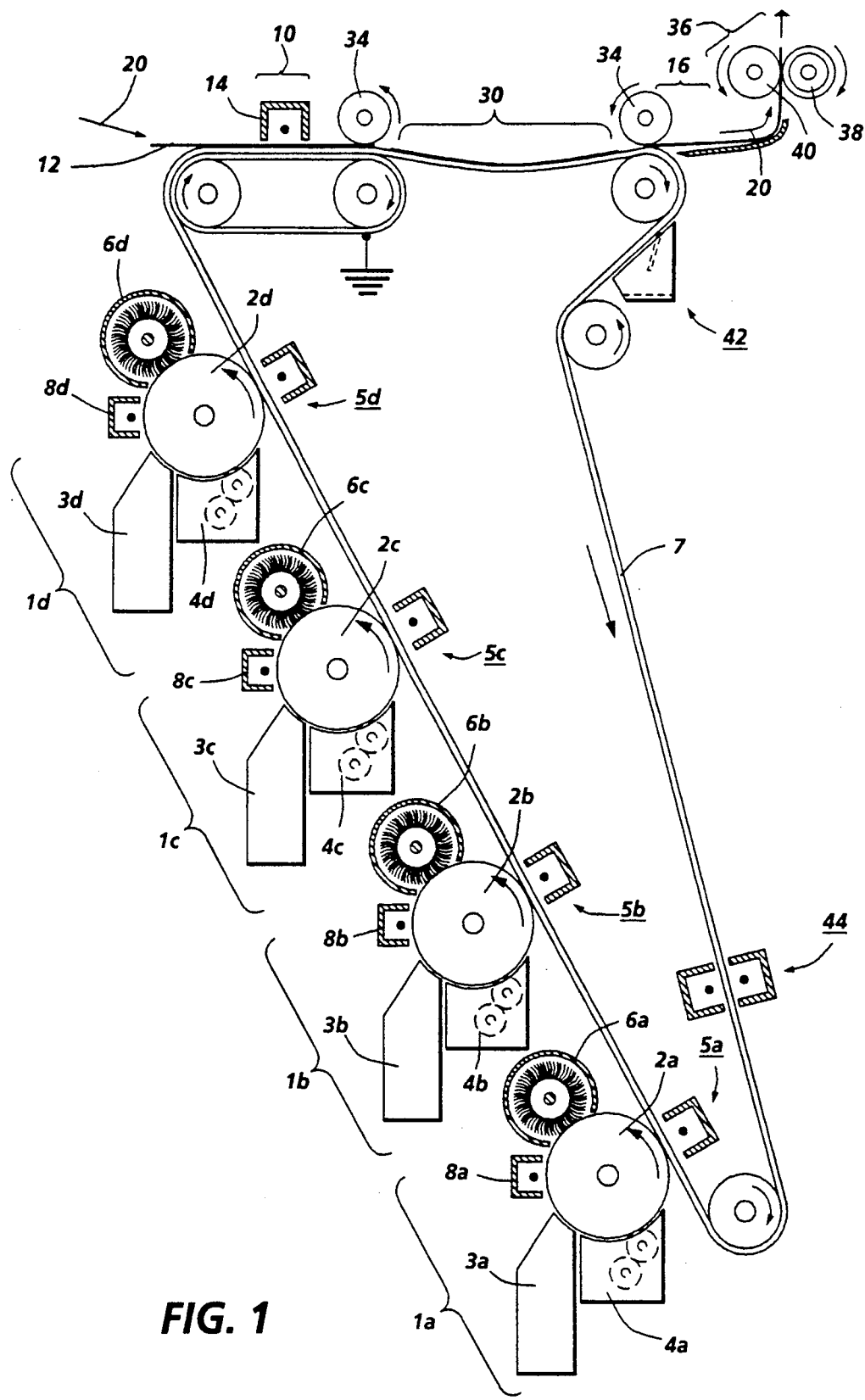
FIG. 1 is a schematic view of a color printing machine.

Although specific terms are used in the following description for the sake of clarity, these terms are intended to refer only to the particular structure of the invention selected for illustration in the drawings, and are not intended to define or limit the scope of the invention.

Several types of electrophotographic copying and printing apparatuses, both color and black and white, have heretofore been proposed and commercialized. Since color is the more complex of the two, the color copying or printing apparatus will be discussed for illustrative purposes. A typical color printing apparatus in which the present invention may be used is illustrated in FIG. 1 of the accompanying drawings.

In dry electrophotographic printing machines, multicolor copying has been achieved with the utilization of an intermediate roller. In devices of this type, successive toner powder images are transferred, in superimposed registration with one another, from the photoconductive drum to an intermediate roller. One such system is described in U.S. Pat. No. 3,957,367 issued to Goel in 1976 which is herein incorporated by reference. In this system, successive toner powder images are transferred from the photoconductive surface to an intermediate roller in superimposed registration with one another. The multicolored image is then transferred to the copy sheet.

In the color electrophotographic copying apparatus of FIG. 1, four image forming units $1a$, $1b$, $1c$ and $1d$ are disposed and respectively have separate photosensitive drums or photoreceptors $2a$, $2b$, $2c$, $2d$ around which are disposed exposure station $3a$, $3b$, $3c$ and $3d$, developing stations $4a$, $4b$, $4c$ and $4d$, transfer stations $5a$, $5b$, $5c$ and $5d$, cleaning stations $6a$, $6b$, $6c$ and $6d$ and charging stations $8a$, $8b$, $8c$ and $8d$. On the other hand, intermediate conveyor means 7, such as an endless belt, is disposed through the image forming units $1a$, $1b$, $1c$ and $1d$ to receive an image at the transfer stations of the image forming units. Each image forming unit $1a-d$ is positioned adjacent intermediate belt 7 to transfer different color toner to intermediate belt 7 in superimposed registration with one another.

The exposure stations $3a-d$ may be any type of rastor input/output scanning device (RIS/ROS) or any combination using the RIS/ROS devices. The preferred embodiment uses a ROS device incorporating a laser. The ROS is a moving spot system that exposes the photoreceptors $2a-d$ to a light intensity. Generally, a laser is the light source since it produces a collimated light bean suited for focusing to a small spot, yet with adequate energy to effectively discharge the photoconductors $2a-d$. The sweep or moving action of the spot is typically obtained by rotating multifaceted mirrors or by reciprocating mirrors attached to galvanometers. Also, a moving spot can be obtained without mechanical devices such as the galvanometer and rotating mirror. An example of a non-mechanical device is an optical defraction member whose internal defraction or reflection properties are varied electrically. Piezoelectric crystals are examples of such devices. An example of a ROS mechanism includes U.S. Pat. No. 4,236,809, herein incorporated by reference.

In such a construction, a latent image of a yellow component color corresponding to the image of an original is first formed on the photosensitive drum $2a$ by conventional electrophotographic means such as the charging station $8a$ and exposure means $3a$ of the first image forming unit $1a$, whereafter a visible image is formed at the developing station $3a$ by a developer having yellow toner, and at the transfer station $4a$, the yellow toner image is transferred to the intermediate conveyor means 7, also known as an intermediate.

On the other hand, while the yellow image is being transferred to the intermediate 7, a latent image of magenta component color is formed in the second image forming unit $1b$, and subsequently, a toner image by magenta toner is obtained at the developing station $4b$, and when the intermediate 7, to which the aforementioned yellow toner image has been transferred in the first image forming unit $1a$, is conveyed to the transfer station $5b$ of the second image forming unit $1b$, the magenta toner image is transferred to a predetermined location on the intermediate 7.

Thereafter, with respect to each of cyan color $1c$ and black color $1d$, image formation is carried out in a similar manner. When superposition of four color toner images is completed on the intermediate 7, the intermediate 7 is moved onto the transfer station 10, where the latent multicolored image is transferred to a sheet of transfer material or copy sheet (sheet) 12. A sheet of transfer material 12 is moved into contact with the toner image at transfer station 10. The sheet 12 is advanced to the transfer station 10 by conventional sheet feeding apparatus, not shown. Preferably, sheet feeding apparatus includes a feed roll contacting the upper most sheet of a stack of copy sheets. Feed rollers rotate so as to advance the uppermost sheet from stack into contact with intermediate 7 in a timed sequence so that the toner powder image thereon contacts the advancing sheet at the transfer station 10.

After completion of the image transfer from the separate photosensitive drums $2a-d$ to an intermediate 7, the drums are cleaned by the cleaning stations $6a-d$ to remove any residual toners therefrom, thus becoming ready for the next cycle of latent image formation and development.

Transfer station 10 includes a corona generating device 14 which sprays ions of a suitable polarity onto the backside of sheet 12. The corona device 14 attracts the charged toner powder images from intermediate belt 7 to sheet 12. After transfer, the sheet 12 continues to move, in the direction of arrow 20, to detacking station 16, where sheet 12 is separated from intermediate 7.

Located before detacking station 16 and after transfer station 10 is non-tensioned loop or buckle 30, as seen in FIG. 1. Buckle 30 is achieved by providing an excess length of intermediate 7 between transfer station 10 and detacking station 16. Several designs of gears, resilient roller 34, etc. will work to maintain the tension of the intermediate outside of buckle 30 while preserving the non-tensioned condition within buckle 30. FIG. 1 illustrates the use of resilient rollers which contact the outside edges of the intermediate 7 and creates the non-tensioned buckle 30, while maintaining the remainder of the intermediate 7 under tension.

Figure 2:
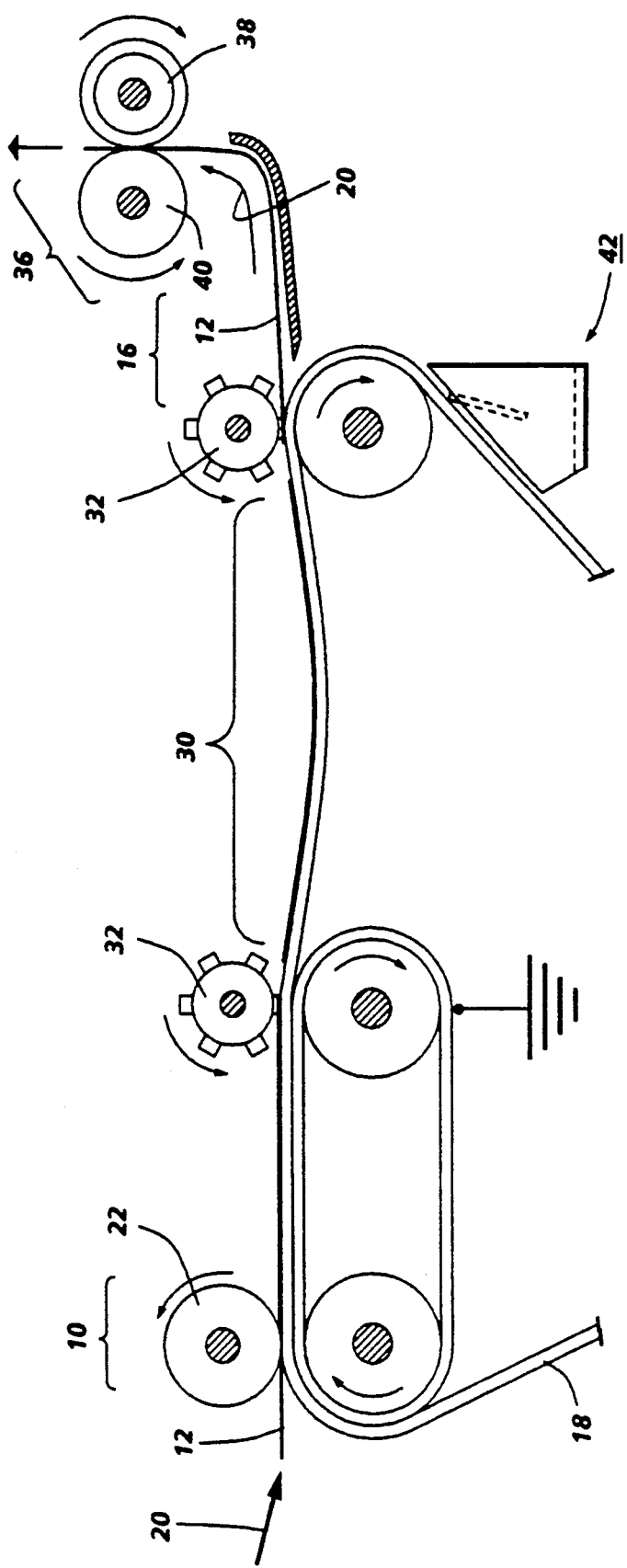
FIG. 2 is a fragmentary portion of a electrophotographic printing machine using a photoreceptor, electrically biased transfer roller, and gears.

FIG. 2 illustrates an alternative arrangement. Photoreceptor belt 18, typically used in both color and black and white copy and printing machines, electrostatically holds the toner image. Electrically biased transfer roller 22, which performs substantially the same function as the corona generating device 14 except that pressure is also applied, transfers the toner image to the sheet 12. Sheet 12 proceeds to the buckle 30 where gears 32 mesh with holes or perforations located in the edges to maintain the buckle 30. Therefore, tension is maintained throughout the intermediate except between the gears 32, known as the non-tensioned buckle 30. Next, sheet 12 proceeds the same as in the following discussion of FIG. 1.

In explanation for the non-tensioned buckle, electrostatic charges are what hold the toner particles or image onto the intermediate and copy sheet. To move the toner image from the intermediate 7 onto copy sheet 12, a stronger charge must be found on the copy sheet to attract the toner image onto it. If there is not sufficient charge on the sheet 12 or if there is too much overall charge on the intermediate, the transfer of the image will be adversely effected. The amount of image transfer accomplished is called transfer efficiency. Thus, the better the transfer efficiency the better the image will be on the final copy sheet 12. This is true for intermediate belts 7 or for other types of flexible belts, such as photoreceptors.

In the present invention, a two step transfer process is utilized. The first step being the standard transfer operation. That is, an opposite charge, from a corotron-type device or a BTR, is laid down onto the back of a sheet; thus attracting an oppositely charged toner image found on an image bearing surface, in this case an intermediate 7, to the sheet. This in effect will transfer the majority of the toner image, thus achieving the majority of the transfer efficiency.

The second transfer step originates from the buckle 30. By creating a curved non-tensioned path (buckle 30), residual toner particles, those not transferred in the first transfer step, will be transferred to the sheet. It is understood, given two non-intersecting curved parallel paths, that the outside path will traverse farther than the inside path to move from one point to another. In this case, the intermediate 7, outside path, will travel farther than the sheet 12, inside path. A movement between the intermediate 7 and sheet 12, in a non-tensioned condition, will roll the toner whose charge is not uniformly distributed and thus, disrupt and weaken the electrostatic forces holding the residual toner image onto intermediate 7. It is believed that as little as one-half toner particle circumference of movement between the intermediate 7 and sheet 12 is sufficient to cause the residual toner image to transfer to the sheet 12. Therefore, by running a copy sheet 12 through buckle 30 after transfer station 10 and before detacking station 16 the transfer efficiency is increased over a similar system not employing the buckle 30. Moreover, it is believed that the zero tension loop enhances intermediate conformability between intermediate 7 and sheet 12 which can not be achieved in a tensioned system. The force creating conformance is determiend by the residual charges on the intermediate and the paper.

It is noted again, that this same principle holds true for a flexible photoreceptor, or other flexible belts, in a color or black and white printer or copier as well as the discussed intermediate flexible material.

Continuing with the discussion of FIG. 1, once the copy sheet 12 is separated from the intermediate 7 at detacking station 16 it is advanced to fusing station 36. Fusing station 36 permanently affixes the transferred powder image to sheet 12. Preferably, fusing station comprises a heated fuser roller 38 and a back-up roller 40 with the toner powder image contacting fuser roller 38. In this manner, the toner powder image is permanently affixed to sheet 12. After fusing, a chute, not shown, guides the advancing sheet 12 to catch tray, also not shown, for subsequent removal from the printing machine by the operator.

After the sheet 12 is separated from intermediate 7, the residual toner particles and the wrong sign and color toner particles carried by the non-image areas on the photoreceptor are removed therefrom. These particles are removed from intermediate 7 at cleaning station 42.

Subsequent to cleaning, an AC neutralization corotron 44 floods the intermediate 7 to dissipate any residual electrostatic charge remaining prior to the beginning of the whole printing cycle.

It is to be understood, however, that even though numerous characteristics and advantages of the present invention have been set forth in the foregoing description, together with details of the structure and function of the invention, the disclosure is illustrative, and changes in matters of order, shape, size, and arrangement of parts may be made within the principles of the invention and to the full extent indicated by the broad general meaning of the terms in which the appended claims are expressed.

What is claimed is:

1. A printing machine of a type having a toner image interposed between a flexible member and a sheet, including:
   means for transferring the toner image from the flexible member to the sheet;
   means for separating the sheet from the flexible member; and
   means, located intermediate the transferring means and the separating means, for providing relative motion between the sheet and the flexible member for improving transfer efficiency.

2. A printing machine according to claim 1, wherein said providing means comprises a means for creating a substantially non-tensioned condition in the flexible member and sheet so as to reduce electrostatic forces between the toner image and flexible member for improving transfer efficiency.

3. A printing machine according to claim 2, wherein the creating means includes:
   means for forming a non-tensioned buckle in a portion of the flexible member located intermediate the transferring means and the separating means so as to form the non-tensioned condition in the buckle portion of the flexible member and a tensioned condition in a remainder of the flexible member.

4. A printing machine according to claim 3, wherein the forming means further comprises means for gripping the flexible member on outside edges so as to maintain the non-tensioned buckle thus improving transfer efficiency.

5. A printing machine according to claim 4, wherein said gripping means is at least one set of toothed gears, engaging perforations in the outside edges of the flexible member.

6. A printing machine according to claim 4, wherein said gripping means is at least one set of pinch rollers engaging the outside edges of said flexible member.

7. A printing machine according to claim 2, wherein said flexible member and sheet move through said transferring means in unison.

8. A printing machine according to claim 2, wherein said transferring means includes a corona generating device.

9. A printing machine according to claim 2, wherein said transferring means includes an electrically biased transfer roller.

10. A printing machine according to claim 2, wherein said flexible member is a photoreceptor.

11. A method of transferring a toner image from a flexible member to a sheet, comprising the steps of:
    placing a toner image onto the flexible member;
    bringing the sheet into contact with the flexible member;
    transferring the toner image from the flexible member to the sheet in contact therewith; and
    providing relative motion between the sheet and the flexible member while the sheet is in contact with the flexible member for improving transfer efficiency by reducing electrostatic charges between the toner image and flexible member.

12. A method of transferring a toner image according to claim 11, wherein said providing step includes creating a substantially non-tensioned condition in the flexible member and sheet so as to reduce electrostatic forces between the toner and flexible member for improving transfer efficiency and enhancing conformance.

13. A method of transferring a toner image according to claim 11, further comprising the step of separating the sheet from the flexible member after the step of creating the non-tensioned condition.

14. A method of transferring a toner image from a flexible member to a sheet, comprising the steps of:
    placing a toner image onto the flexible member;
    bringing the sheet into contact with the flexible member;
    transferring the toner image from the flexible member to the sheet in contact therewith; and
    providing relative motion between the sheet and the flexible member for improving transfer efficiency by reducing electrostatic charges between the sheet and flexible member, wherein the step of providing includes creating a substantially non-tensioned condition in the flexible member and sheet so as to reduce electrostatic charges between the toner and flexible member for improving transfer efficiency, wherein the step of creating comprises the step of forming a buckle in the portion of the flexible member located intermediate the step of transferring and the step of separating.

15. A method of transferring a toner image according to claim 14, wherein the step of forming a buckle further comprises gripping the flexible member on outside edges so as to allow a non-tensioned buckle in one portion of the flexible member and a tensioned condition in a remainder of the flexible member.

16. A method of transferring a toner image according to claim 15, wherein the step of gripping the flexible member further comprises meshing at least one set of toothed gears into perforations on the outside edges of the flexible member so as to provide the buckle for the forming step which provides the non-tensioned condition in the creating step.

17. A method of transferring a toner image according to claim 15, wherein the step of gripping the flexible member further comprises pressing at least one pair of resilient rollers onto the outside edges of the flexible member so as to provide the buckle for the forming step which provides the non-tensioned condition in the creating step.

18. A color printing machine of a type having a plurality of different color toner images on a flexible member, including:
    means for transferring the color toner images from the flexible member to a sheet in contact therewith;
    means for separating the sheet from the flexible member; and
    means, located intermediate the transferring means and the separating means, for providing relative motion between the sheet and the flexible member for improving transfer efficiency.

19. A printing machine according to claim 18, wherein said providing means comprises a means, located intermediate the transferring means and separating means, for creating a substantially non-tensioned condition in the flexible member and sheet so as to reduce electrostatic charges between the toner image and flexible member for improving transfer efficiency.

20. A printing machine according to claim 19, wherein the creating means includes:
    means for forming a non-tensioned buckle in a portion of the flexible member located intermediate the transferring means and the separating means so as to form the non-tensioned condition in the buckle portion of a flexible member and a tensioned condition in the remainder of the flexible member.

21. A printing machine according to claim 20, wherein the forming means further comprises means for gripping the flexible member on outside edges for maintaining the buckle creating means.

22. A printing machine according to claim 21, wherein said gripping means is at least one set of toothed gears, engaging perforations in the outside edges of the flexible member, so as to maintain said buckle in said flexible member thus creating a non-tensioned condition between the toner image and flexible member for improving transfer efficiency.

23. A printing machine according to claim 21, wherein said gripping means is at least one set of pinch rollers engaging the outside edges of said flexible member so as to maintain said buckle in said flexible member thus creating a non-tensioned condition between the sheet and flexible member for improving transfer efficiency.

24. A printing machine according to claim 18, wherein said flexible member and sheet move through said transferring means in unison.

25. A printing machine according to claim 18, wherein said transferring means includes a corona generating device.

26. A printing machine according to claim 18, wherein said transferring means includes an electrically biased transfer roller.

27. A printing machine according to claim 18, wherein said flexible member is a photoreceptor.

* * * * *